Figure 1:
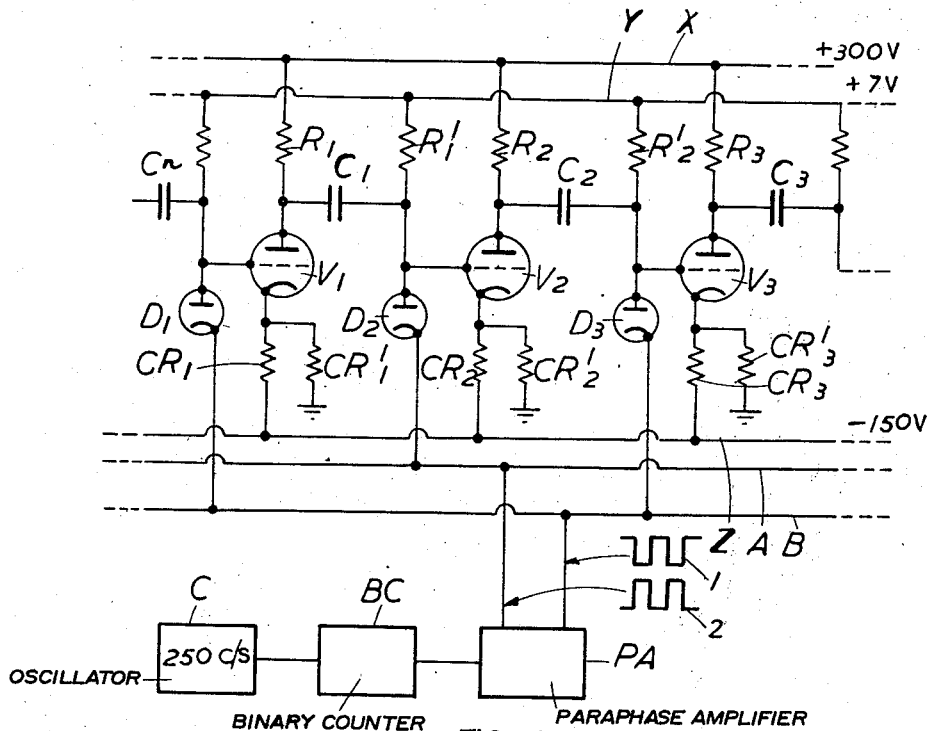

Aug. 6, 1957   E. L. C. WHITE   2,802,104
VALVE CHAIN CIRCUITS
Filed March 23, 1954   2 Sheets-Sheet 1

INVENTOR
E. L. C. White
BY
ATTORNEYS

United States Patent Office 2,802,104
Patented Aug. 6, 1957

2,802,104
VALVE CHAIN CIRCUITS

Eric Lawrence Casling White, Iver, England, assignor to Electric & Musical Industries Limited, Hayes, England, a British company Application March 23, 1954, Serial No. 418,196

Claims priority, application Great Britain March 27, 1953

2 Claims. (Cl. 250—27)

This invention relates to valve chain circuits, such as employed for example as pulse distributors in multi-way electronic switching circuits or as shifting registers in electronic computing apparatus.

In multi-way electronic switching circuits, and for other purposes, a pulse distributor giving successive pulse outputs each on a separate conductor is required. This can be achieved in practice by means of a so-called ring counter consisting of a ring of identical switchable devices each coupled to its neighbours in the ring and so arranged that one device at a time is in a different condition from all the others, and on the application of a switching pulse simultaneously to all the devices the effect is to transfer the distinctive "condition" to the next device in order round the ring. Thus, the distinctive condition traverses round the ring making a complete circuit after $n$ switching pulses where $n$ denotes the number of devices in the ring. The switchable devices may be, for example, thermionic valve triggers of the kind used in the shifting register described in the specification of United States patent application Serial No. 309,232, now Patent No. 2,785,304, granted March 12, 1957. These triggers each comprise a pair of cross-coupled thermionic valves and with a ring of such triggers any binary pattern can be shifted round the ring, but for some purposes such triggers are uneconomical of components, especially where it is necessary to shift merely a single distinctive condition round the ring.

The object of the present invention is to provide a simple form of thermionic valve chain circuit which is especially suitable for use as a pulse distributor though it can also be used as a binary shifting register.

According to the present invention there is provided a valve chain circuit comprising a plurality of valves so coupled in succession that one of two conditions (the conducting condition and the non-conducting condition) can be transferred successively from one valve to the next by the application of switching pulses to the valves, a change in the condition of a valve in response to a switching pulse causing a reverse change in the condition of an adjacent valve, and wherein means are provided for applying the switching pulses alternately to alternate valves of the series so that the reverse changes are not counteracted by switching pulses.

In order that the invention may be clearly understood and readily carried into effect, the invention will be described with reference to the accompanying drawings.

Figure 2:
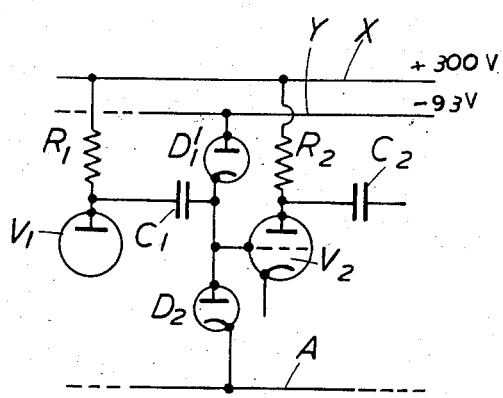
Figure 3:
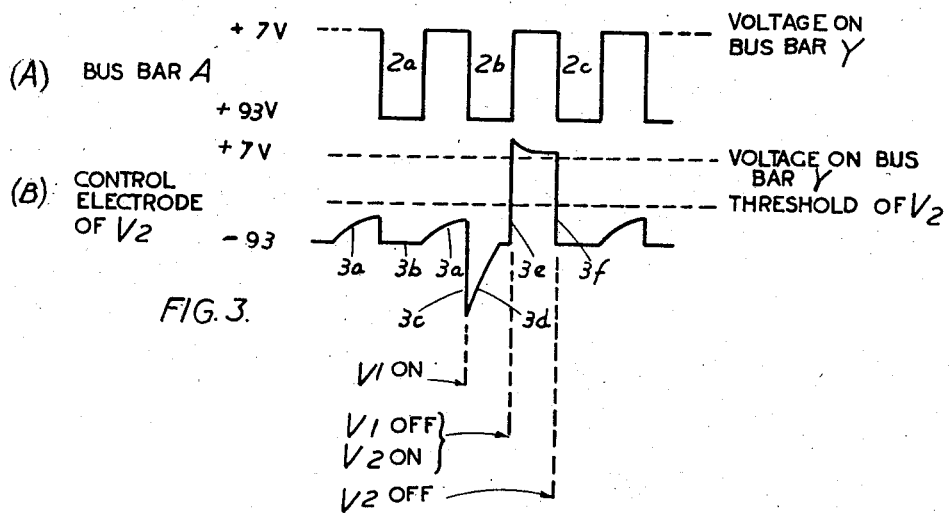
Figure 4:
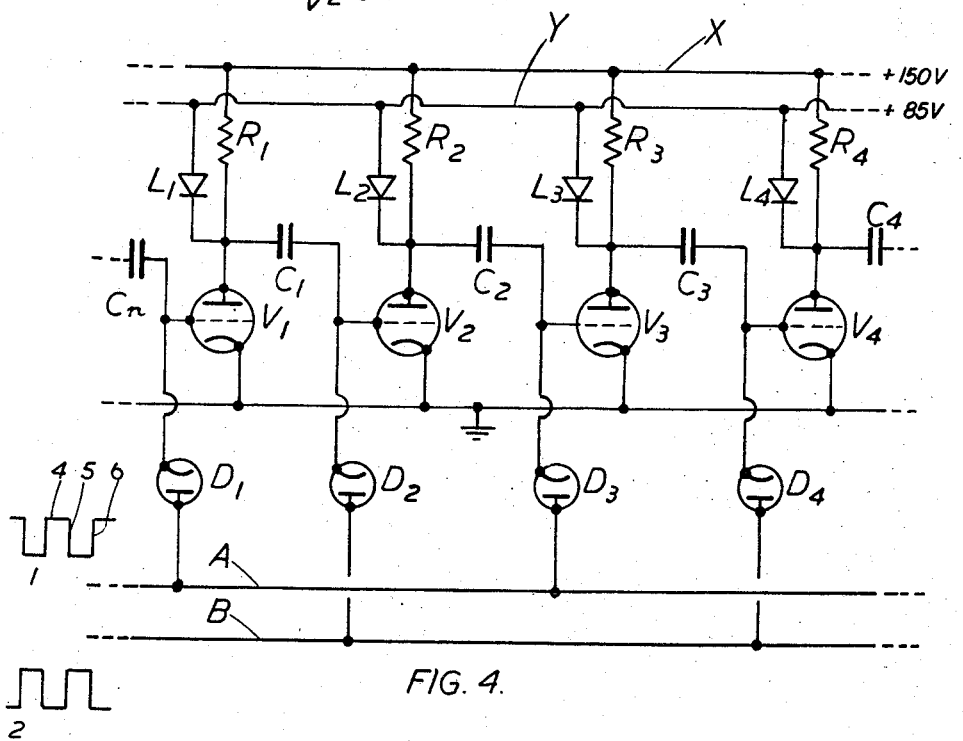

Figure 1 illustrates one example of a ring counter which embodies the present invention, Figure 2 illustrates a modification thereof, Figure 3 comprises idealised waveforms explanatory of the operation of Figures 1 and 2, and Figure 4 illustrates another form of ring counter which embodies the present invention.

Referring to Figure 1 the counter comprises a series of thermionic vacuum valves V1, V2 . . . V$n$, each a triode valve and each with identical circuit connections and coupled to its neighbours so as to form a ring chain. Since the valve stages are identical, only three of the stages, containing the valves V1, V2 and V3, are shown, the corresponding components in the different stages being distinguished by the suffixes 1, 2 and 3, and the description will be confined to the stages shown. The valves V1, V2 and V3 have their anodes connected to the positive H. T. bus-bar X by resistors R1, R2 and R3, and the anodes are also connected to the control electrodes of the succeeding valves by capacitors C1, C2 and C3 having leak resistors R'1, R'2 and R'3 which are returned to a bus-bar Y maintained at a small fixed positive potential, say 7 volts as indicated. The control electrodes of the valves are, moreover, coupled alternately to switching pulse bus-bars A and B via diode valves D1, D2 and D3 which have their anodes nearer the control electrodes. The cathode of the valve V1 is connected to the junction of cathode resistors CR1 and CR'1 which are, as shown, connected in series between ground and a negative H. T. bus-bar Z, the valves V2 and V3 having similar cathode resistors CR2, CR'2 and CR3, CR'3. The manner of coupling the valves V1, V2 . . . V$n$ shown in the drawing form the subject matter of co-pending United States patent application Serial No. 418,195, filed March 23, 1954, by K. G. Huntley and E. L. C. White. The bus-bars A and B receive complementary pulse waveforms 1 and 2 from the output terminals of a paraphase amplifier PA, the input to the paraphase amplifier being derived from a binary counter BC which is triggered by an oscillator C at a desired frequency. The paraphase amplifier is, moreover, arranged to be such that the pulse waveforms 1 and 2 have a maximum level of approximately the voltage which is maintained on the bus-bar Y and have a minimum level of about —93 volts. It is, however, convenient to regard the pulse waveforms as consisting of negative pulses extending from a datum level which is approximately the voltage on the bus-bar Y, as indicated in Figure 3($a$) where references 2$a$, 2$b$ and 2$c$ denote successive negative pulses on the bus-bar A. On this basis, the bus-bars A and B alternately receive negative switching pulses from the paraphase amplifier PA.

The arrangement of Figure 1 is such that, in operation, all the valves V1, V2 . . . V$n$ remain in the non-conducting condition except one, the conducting condition being transferred continuously round the ring by virtue of the application of the switching pulses to the bus-bars A and B. It will be assumed that at a particular time each of the valves V1, V2 and V3 is non-conducting and the left-hand electrodes of the capacitors C1, C2 and C3 are therefore at the positive H. T. potential, say 300 volts. During the occurrence of a negative switching pulse on either bus-bar the associated diodes (D1, D3 in the case of bus-bar B and D2 in the case of bus-bar A) conduct and switch the right-hand electrodes of the respective capacitors to the pulse voltage, namely —93 volts. In the interval between the negative switching pulses on the respective bus-bars A and B, the diodes are non-conducting and the right-hand electrodes of the capacitors rise towards the potential on the bus-bar Y. This is illustrated in Figure 3(B) which shows the potential waveform on the control electrode of the valve V2 during part of a cycle of operation and in this waveform the portions 3$a$ correspond to intervals between switching pulses on the bus-bar A and the portion 3$b$ corresponds to the negative pulse 2$a$ on the bus-bar B when the control electrode of the capacitor C1 is switched to a level of —93 volts. It will be observed from the portions 3$a$ that the interval between two switching pulses is insufficient for the potential on the control electrode to rise to the threshold of the valve V2. At the time of the leading edge of the pulse 2$b$, it will be assumed that the conducting condition in its circulation round the ring reaches the valve V1. When the valve V1 is switched to the conducting condition its anode potential falls and this fall of potential is transferred to the control electrode of the valve V2, as indicated by 3$c$ in Figure 3. During the pulse 2$b$, the diode D2 remains, at least initially, non-conducting and the capacitor C1 discharges through the resistor R'1 and valve V1 to produce the rise in potential at the control electrode of the valve V2 indicated by 3d. Preferably the arrangement is such that the diode D2 limits the rise of potential as shown. At the time of the trailing edge of the pulse 2b, the bus-bars A and B interchange their potentials, the valve V1 is switched off by the fall of potential on bus-bar B, causing the anode potential of V1 to rise and carry the potential at the control electrode of the valve V2 above the threshold of the valve V2 as indicated by 3e, the rise in potential at the control electrode being limited by conduction of the diode D2. The conducting condition is thus transferred to the valve V2, and it is transferred in a similar manner to the valve V3 by the pulse 2c which again switches the control electrode of V2 to −93 volts as indicated by 3f, the valve V2 being then switched off. It will therefore be appreciated that the change in the condition of each valve, brought about by the action of a switching pulse produces a reverse change in the condition of the succeeding valve, and when the succeeding valve, in turn, is restored to its original condition by the next switching pulse, the distinctive condition (in the present example, the conducting condition) is transferred to the next valve, and so on. By applying the switching pulses alternately to the bus-bars A and B, and thus alternately to alternate valves, the "reverse" changes are not counteracted by the switching pulses. The circulation of the conducting condition is repeated indefinitely by the mechanism described so long as switching pulses are applied to the bus-bars A and B.

The arrangement of Figure 1 requires that frequency tolerances in the pulses fed to the bus-bars A and B should be within ±30 percent since it will be evident that in the absence of pulses, capacitors C1, C2, C3 . . . can discharge through the leak resistors R′1, R′2, R′3 . . . and switch the succeeding valves prematurely to the conducting condition. The circuit can, however, be made aperiodic, up to a limit set by stray leakage from the capacitors C1, C2, C3 . . ., by replacing the leak resistors R′1, R′2, R′3 . . . by unilaterally conductive devices which may be either crystal diodes with a sufficiently high resistance in the reverse current direction or thermionic diodes. This is illustrated in Figure 2 which shows a thermionic diode valve D′1 in place of the resistor R′1, the diode having its cathode connected to the control electrode of the valve V2 and its anode connected to the bus-bar Y which in this case requires to be maintained at the potential corresponding to the negative peaks in the waveforms 1 and 2, namely −93 volts. The voltage waveform which is now present at the control electrode of the valve V2 is substantially the same as the waveform of Figure 3(B), except that the portions 3a are absent.

In Figures 1 and 2, positive pulses can be derived successively from the cathodes of the valves V1, V2 . . . Vn and negative pulses can be derived from the anodes of these valves, as required.

The form of the invention illustrated in Figure 4 is generally similar to that illustrated in Figure 1 but is designed to operate with all the valves conducting except one and the application of switching pulses to the bus-bars A and B causes the transference of the conducting condition round the ring. Corresponding parts in Figures 1 and 4 are denoted by the same reference numerals and it will be observed that in Figure 4 the diodes D1, D2 D3 . . . are connected with reversed polarities whilst the leak resistors R′1, R′2, R′3 . . . (or the corresponding diodes) are dispensed with. In describing the operation of Figure 4, a time corresponding to the point 4 in the pulse waveforms 1 and 2 will be assumed, the bus-bar A being at zero potential relative to the cathodes of the valves V1, V2, V3 . . . at this time and the bus-bar B being negative. It will also be assumed that all the valves are conducting except the valve V2. The right-hand electrode of the capacitor C1 is below the cut-off potential for the valve V2. The left-hand electrode of the capacitor C2 is at or approaching the positive H. T. potential and the right-hand electrode of this capacitor is at zero potential, this potential being fixed by the flow of current to the control electrode of the valve V3. At the time corresponding to the edge 5 in the pulse waveform 1 the bus-bars A and B interchange their potentials, the diode D2 is rendered conducting and the potential on the control electrode of the valve V2 rises to zero causing the valve V2 to conduct and discharging capacitor C1 through V1 and the control electrode-to-cathode path of V2. As a consequence the anode potential of the valve V2 falls and this fall is transmitted to the control electrode of the valve V3 switching off the latter valve. At the time 6, the bus-bars A and B again interchange their potentials, the valve V3 is switched on and the non-conducting state is transferred to the valve V4. With this circuit successive positive output pulses can be obtained from the anodes of the valves V1, V2, V3 . . . .

In the arrangement of Figure 4 when one of the valves, say V2, is switched off the positive potential excursion at its anode, although it does not alter the state of the valve V3 may produce such a momentary negative pulse at the anode of this valve as to tend to switch off the next succeeding valve. To avoid this liability limiters L1, L2, L3 . . . are connected as shown from the anodes of the valves V1, V2, V3 to a bus-bar Y which is held at a suitable potential. The limiters L1, L2, L3 . . . may be in the form of crystal diodes.

While the invention has been described with reference to ring chain circuits which can be employed as pulse distributors, the invention may also be applied to open chain circuits, in which case it is necessary to feed in a suitable input pulse at intervals of n shift pulses apart, assuming n stages. Such an open chain circuit can also be employed as a binary shifting register. In such an application, the chain may be required to shift any arbitrary binary pattern, that is it may be necessary to shift more than one "pulse" at a time, but this can be achieved with the circuits described provided there is always at least one gap between any pair of such "pulses." Each unit of the register would then consist of two valves and the transfer of a binary state from one unit to the next would require the application of two switching pulses.

In the examples of the invention shown in the drawings, thermionic vacuum valves are used. Other kinds of valves may however be used in some cases, such as gaseous discharge valves and crystal valves (transistors).

What I claim is:

1. A valve chain circuit comprising a series of valves, each having an input electrode and a output electrode, means coupling said valves in succession to form a chain circuit, said means comprising a coupling from the output electrode of the first of each two coupled valves to the input electrode of the second of each two coupled valves and each coupling being responsive to a transition of the first valve from one of two conditions, namely the conducting and the non-conducting conditions, to the other of said conditions to produce the reverse transition in the second valve, a source of switching pulse, a series of unilaterally conductive paths, one for each valve and each having one end connected to said input electrode of the respective valve, and means for applying switching pulses from said source alternately to the other ends of alternate unilaterally conductive paths, the pulses from said source being predetermined to switch a valve from said first condition to said other condition.

2. A circuit according to claim 1, said last-mentioned means comprising means for deriving complementary pulse waveforms from the pulses from said source, and means for applying said complementary waveforms respectively to said other ends of alternate unilaterally conductive paths.

References Cited in the file of this patent
UNITED STATES PATENTS
2,486,491    Meacham _____ Nov. 1, 1949